United States Patent
Kuo

(10) Patent No.: US 12,508,748 B2
(45) Date of Patent: Dec. 30, 2025

(54) MAT AND METHOD TO MANUFACTURE MAT

(71) Applicant: Chun-Fu Kuo, Taichung (TW)

(72) Inventor: Chun-Fu Kuo, Taichung (TW)

( * ) Notice: Subject to any disclaimer, the term of this patent is extended or adjusted under 35 U.S.C. 154(b) by 203 days.

(21) Appl. No.: 18/460,177

(22) Filed: Sep. 1, 2023

(65) Prior Publication Data

US 2023/0405886 A1    Dec. 21, 2023

Related U.S. Application Data

(63) Continuation-in-part of application No. 17/346,609, filed on Jun. 14, 2021, now abandoned, which is a continuation-in-part of application No. 16/231,894, filed on Dec. 24, 2018, now abandoned, which is a continuation-in-part of application No. 15/404,695, filed on Jan. 12, 2017, now abandoned.

(51) Int. Cl.
| | |
|---|---|
| *B29C 43/14* | (2006.01) |
| *B29C 43/02* | (2006.01) |
| *B29C 43/40* | (2006.01) |
| *B29K 21/00* | (2006.01) |
| *B29K 105/04* | (2006.01) |
| *B29L 31/00* | (2006.01) |

(52) U.S. Cl.
CPC .............. *B29C 43/14* (2013.01); *B29C 43/40* (2013.01); *B29C 2043/023* (2013.01); *B29C 2043/144* (2013.01); *B29K 2021/00* (2013.01); *B29K 2105/045* (2013.01); *B29K 2995/0072* (2013.01); *B29L 2031/7324* (2013.01)

(58) Field of Classification Search
CPC ........ B29C 2043/023; B29C 2043/144; B29C 43/021; B29C 43/14; B29C 43/24; B29C 43/40; B29C 69/001; B29K 2021/00; B29K 2105/045; B29K 2995/0072; B29L 2031/7324

See application file for complete search history.

(56) References Cited

U.S. PATENT DOCUMENTS

| | | |
|---|---|---|
| 3,709,843 A | 1/1973 | Zocco |
| 4,941,232 A | 7/1990 | Decker et al. |
| 6,921,502 B1 | 7/2005 | Nord et al. |
| 2011/0193254 A1 | 8/2011 | Kuo |
| 2016/0037949 A1 | 2/2016 | Dawson et al. |
| 2016/0258207 A1 | 9/2016 | Walsh et al. |
| 2019/0084198 A1* | 3/2019 | Wang .................. B29C 43/003 |

OTHER PUBLICATIONS

Rhino Mats wepage http://www.rhinomats.com/reflex_mat.php, archived Nov. 14, 2016, pp. 1-4, accessed Apr. 20, 2018.

* cited by examiner

*Primary Examiner* — Xiao S Zhao
*Assistant Examiner* — Victoria Bartlett
(74) *Attorney, Agent, or Firm* — MUNCY, GEISSLER, OLDS & LOWE, P.C.

(57) ABSTRACT

The mat of the present invention includes a main body integrally formed by a plastic material. The main body at least has a first surface and a second surface adjacent to the first face. The first face and the second face have different surface physical characteristics. The first surface and the second surface are shaped into a third surface and a fourth surface respectively. The third surface and the fourth surface have a substantially same surface physical characteristic. An angle between the third surface and the fourth surface outside the main body is a specific value.

11 Claims, 4 Drawing Sheets

MAT AND METHOD TO MANUFACTURE MAT

BACKGROUND OF THE INVENTION

Field of the Invention

The present invention is a CIP of application Ser. No. 17/346,609, filed Jun. 14, 2021, which is a CIP of application Ser. No. 16/231,894, filed Dec. 24, 2018, which is a CIP of application Ser. No. 15/404,695, filed Jan. 12, 2017, the entire contents of which are hereby incorporated by reference.

Description of the Prior Art

Generally, mats made of rubber are manufactured by placing rubber material in a mold to shape. To manufacture mats in various sizes and shapes, molds having various sizes and shapes have to be prepared. Thus, the cost is high. Especially, the cost is increased when the mats are manufactured in a small amount.

Besides, to manufacture a mat having a slight difference in angle, different molds have to be prepared. Thus, cost of stock is hardly reduced.

US2016/0037949 discloses that the outer surface is formed by adhering with sheets, instead of being integrally formed. Thus, US2016/0037949 fails to disclose that the main body integrally formed by plastic material has a third surface and a fourth surface having different mean surface roughnesses.

Similarly, U.S. Pat. No. 6,921,502 discloses that the outer surface is formed by adhering with sheets, instead of being integrally formed, and thus it fails to disclose that the main body integrally formed by plastic material has a third surface and a fourth surface having different mean surface roughnesses.

US2016/0037949 describes varying the surface roughness between two surfaces. However, US2016/0037949 does not disclose that the shaping reduces differences between the two surfaces.

U.S. Pat. No. 3,709,843 discloses that the partially cured foam sheet is cut into lengths of 13 feet; that is, the partially cured foam sheet is only cut at a right angle but not chamfered and slopped to provide a top end surface and a lateral surface having an angle larger than 180 degrees and smaller than 225 degrees. As such, the right-angled lateral surface cannot be heated and compressed by a mold, at the same time together with the top end surface, so that there will be a large difference of mean surface roughnesses between the top end surface and the right-angled lateral surface.

SUMMARY OF THE INVENTION

The main object of the present invention is to provide a mat which is easy to be manufactured in various sizes.

To achieve the above and other objects, a mat of the present invention includes a main body integrally formed by a plastic material. The main body at least has a first surface and a second surface adjacent to the first face. The first face and the second face have different surface physical characteristics. The first surface and the second surface are shaped into a third surface and a fourth surface respectively. The third surface and the fourth surface have a substantially same surface physical characteristic. An angle between the third surface and the fourth surface outside the main body is a specific value.

To achieve the above and other objects, a method to manufacture mat of the present invention includes the following steps.

Shaping: shaping a main body with a plastic material with a mold. The main body at least has a first surface.

Cutting: cutting out a part of the main body to form a second surface. A surface physical characteristic of the second surface is different from that of the first surface. The second surface is adjacent to the first surface.

Shaping again: the first surface and the second surface under surface processing so that a third surface and a fourth surface are formed from the first surface and the second surface respectively wherein the third surface and the fourth surface have substantially same surface physical characteristics. An angle between the third surface and the fourth surface outside the main body is a specific value.

Thereby, the mat can be manufactured into various sizes and shapes without preparing various molds.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
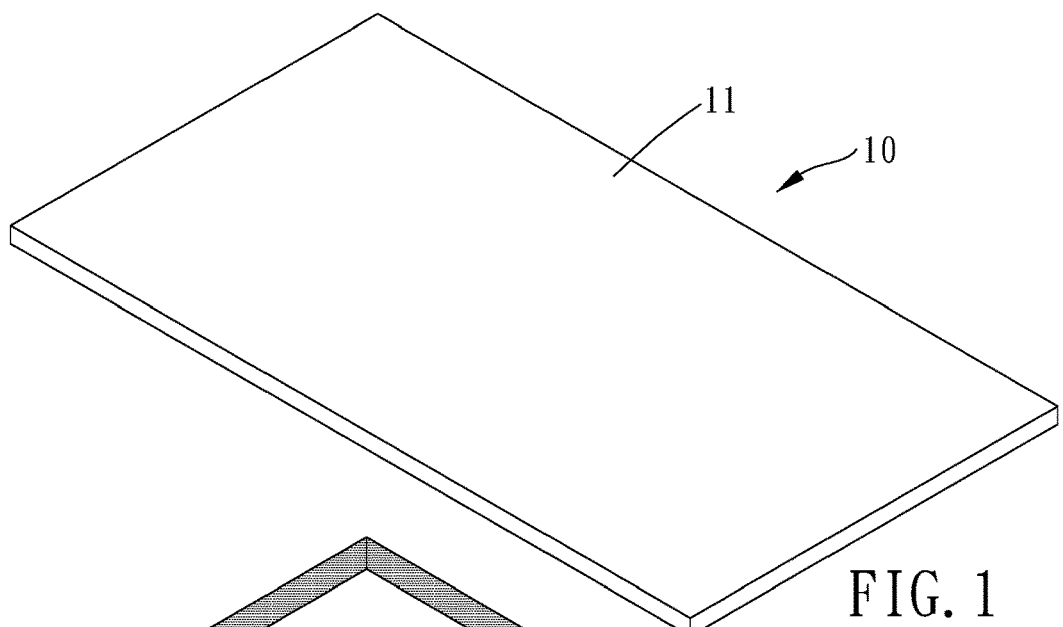
FIG. 1 is a stereogram of a mat of the present invention during a step of shaping.
Figure 1A:
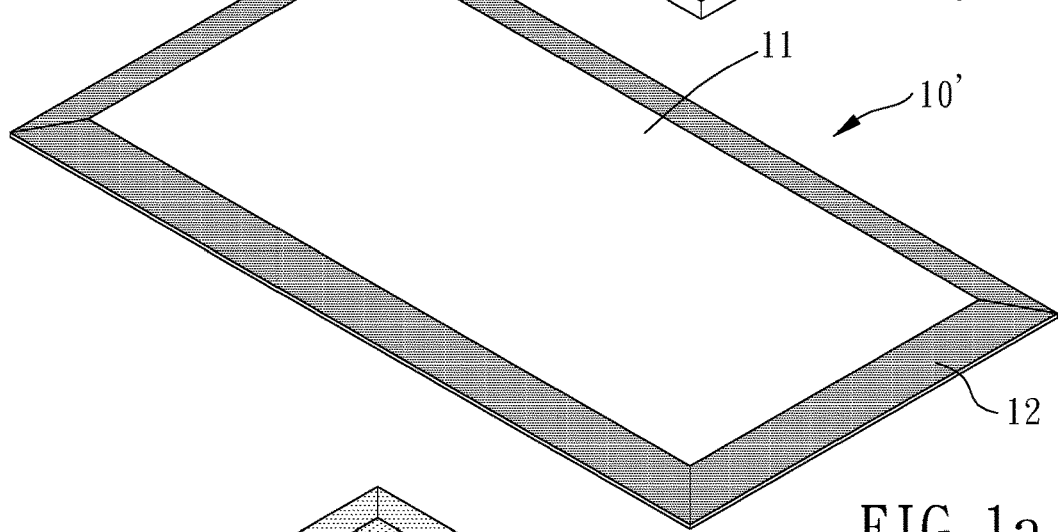
FIG. 1a is a stereogram of a mat of the present invention during a step of cutting.
Figure 1B:
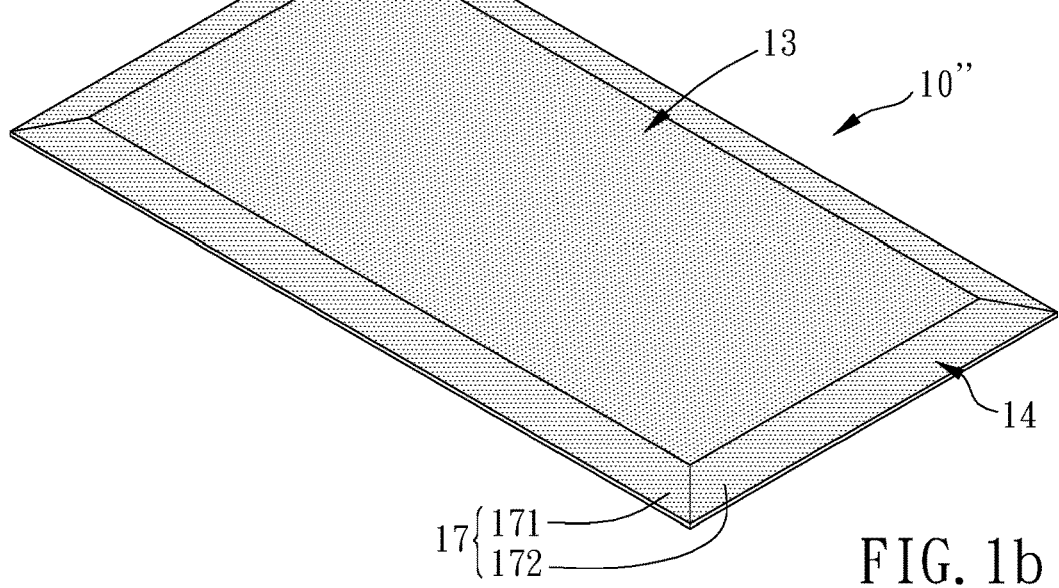
FIG. 1b is a stereogram of a mat of the present invention during a step of shaping again.
Figure 2:
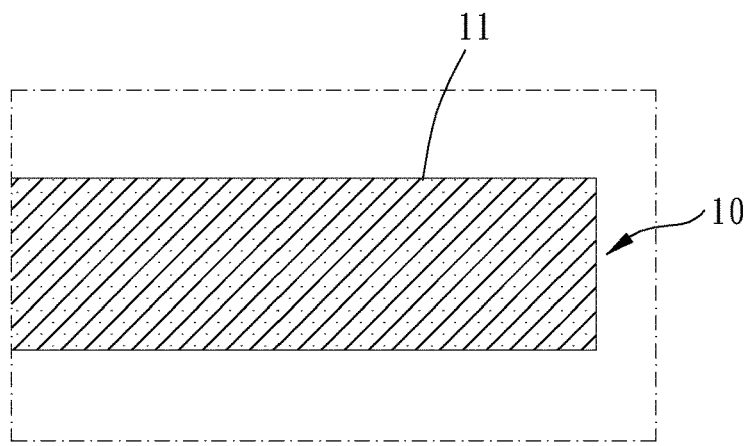
FIG. 2 is a partial cross-section of a mat of the present invention during a step of shaping.
Figure 2A:
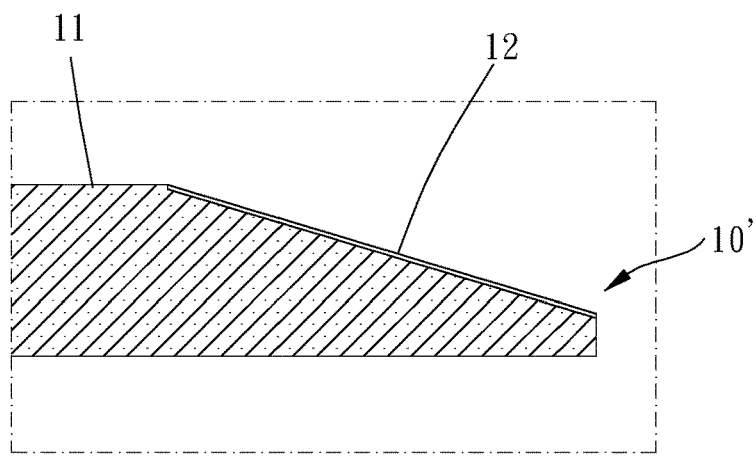
FIG. 2a is a partial cross-section of a mat of the present invention during a step of cutting.
Figure 2B:
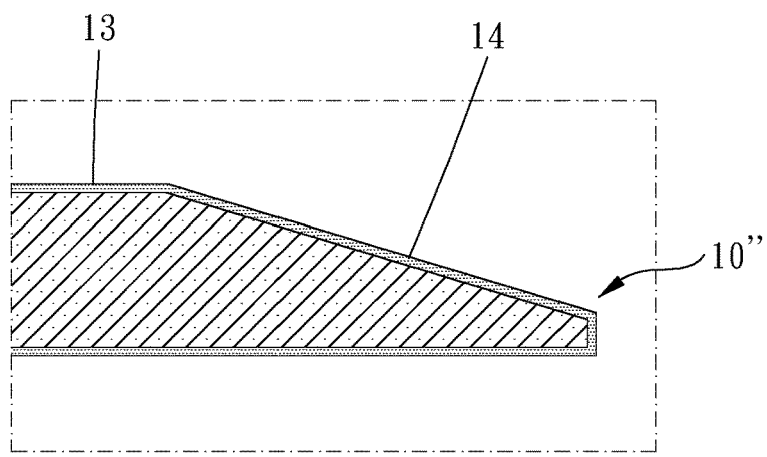
FIG. 2b is a partial cross-section of a mat of the present invention during a step of shaping again.

Please refer to FIGS. 1 to 2b, the mat of the present invention includes a main body 10 integrally formed by a plastic material, such as rubber or rubber composite to be soft and resilient. The main body 10 at least has a first surface 11 and a second surface 12 adjacent to the first surface 11. The first surface 11 has a surface physical characteristic, such as mean surface roughness, different from that of the second surface 12. The first surface 11 and the second surface 12 are shaped into a third surface 13 and a fourth surface 14 respectively wherein the third surface 13 and the fourth surface 14 have different surface physical characteristic such as mean surface roughness. However, the surface physical characteristics of the third surface 13 and the fourth surface 14 can have extremely slight differences. An angle between the third surface 13 and the fourth surface 14 outside the main body 10" is preferably larger than 180 degrees but not larger than 270 degrees (preferably smaller than 225 degrees) so that the fourth surface 14 is an inclined face with respect to the third surface 13, and thus being advantageous for heating and compressing the first surface 11 and the second surface 12 by using a mold. It is noted that if the angle between the first surface 11 and the second surface 12 is larger than or equal to 270 degrees, the second surface 12 cannot be heated and compressed by the mold so that the relatively smooth fourth surface cannot be obtained and there will be a large difference of mean surface roughnesses between the third surface and the fourth surface.

In the present embodiment, the mat is cuboid and having a top face and a bottom face. A circumferential face including four lateral faces connects the top face and the bottom face therebetween. The first surface 11 is located on the top face, and the second surface 12 is located on each of the lateral faces. Preferably, a plurality of bumps formed integrally on the main body 10 are distributed over the third surface 13 and the fourth surface 14. For example, the bumps can be formed by a mold whose inner surface having a plurality of holes.

Figure 3:
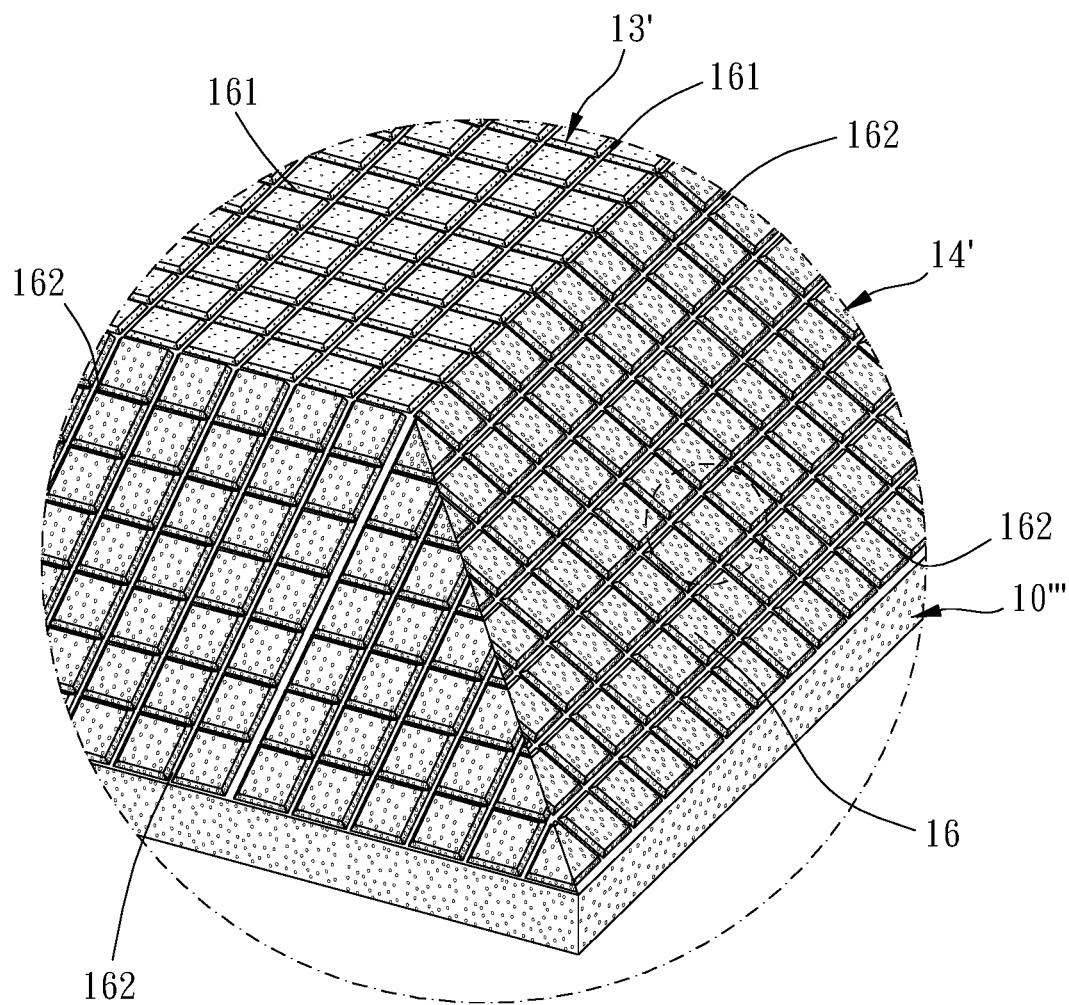
FIG. 3 is a partial stereogram of a mat according to another embodiment of the present invention.
Figure 4:
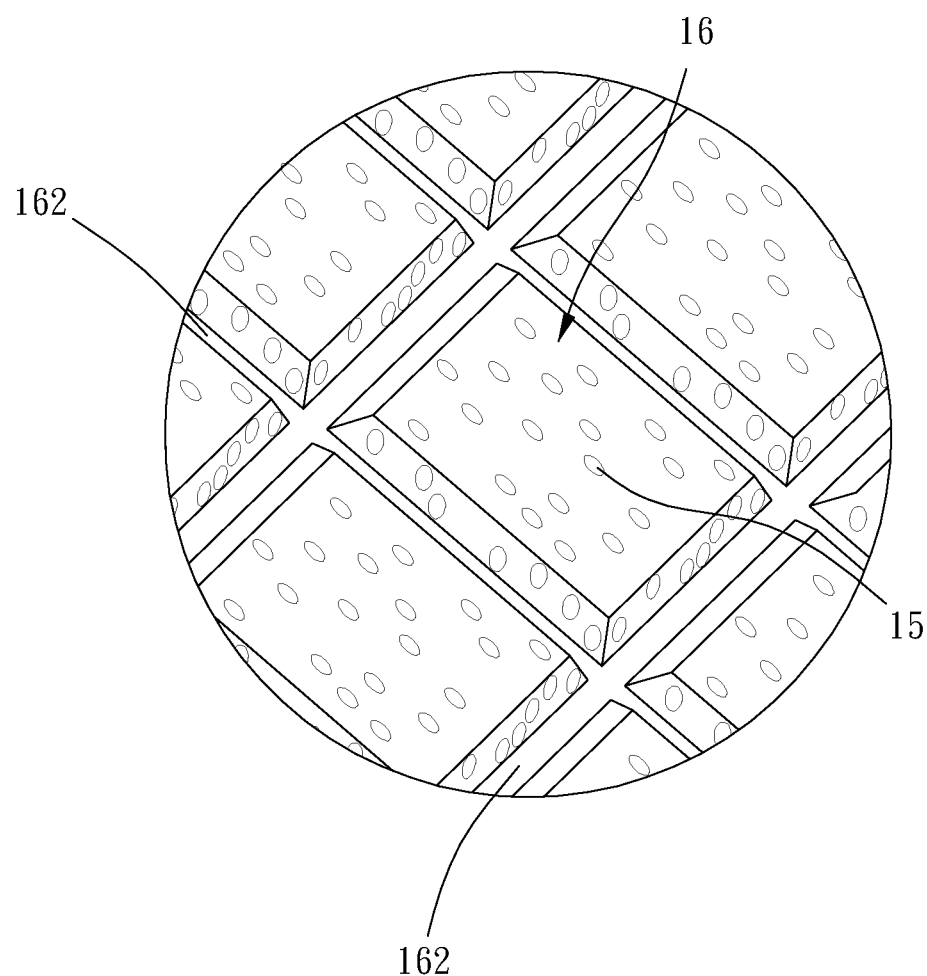
FIG. 4 is a partial enlargement of FIG. 3.

Specifically, as shown in FIGS. 3 and 4, the main body 10''' is integrally formed of one piece, and the third surface 13' and the fourth surface 14' are integrally formed as parts of the main body 10'''. Depending on different processing such as embossing, calendering, grinding, cutting, hot-press, before or after the third surface 13' and the fourth surface 14' are completed, at least one of the mean surface roughnesses of the third surface 13' and the fourth surface 14' is between 0.08 μm to 80 μm (preferably between 0.08 μm to 8.0 μm, for good surface consistency, aesthetics and integrity, but not for anti-slip purpose). The main body 10''' is a foamed member and further includes a plurality of open cells 15 which are disposed on at least one of the third surface 13' and the fourth surface 14'; however, the main body may be a solid member. An area of the plurality of open cells 15 distributed on the fourth surface 14' is at least 15% of a total area of the fourth surface 14'. The plurality of open cells 15 may be disposed on the third surface 13' and the fourth surface 14', and an amount of the open cells 15 distributed on the fourth surface 14' is greater than an amount of the open cells 15 distributed on the third surface 13'. Preferably, the open cell 15 distributed on the fourth surface 14' has a pore size greater than that of the open cell 15 distributed on the third surface 13'. At least one of the third surface 13' and the fourth surface 14' further includes a plurality of bumps 16 integrally formed thereon, and the plurality of open cells 15 are distributed on at least part or all of the plurality of bumps 16. The mean surface roughness of the fourth surface 14' is preferably at least 1.10 times the mean surface roughness of the third surface 13'. There are 150 to 250 of said open cells 15 per square inch on the second surface 12, and after the first surface 11 and the second surface 12 are heated and compressed with the second mold, the area of the plurality of open cells 15 distributed on the fourth surface 14' is reduced to be at least less than 55% of an area of the plurality of open cells 15 distributed on the on the second surface 12 (for example, pore smoothing rate is 45-80%). The approximation of the mean surface roughnesses of the third surface 13' and the fourth surface 14' is at least 70%. In other words, the difference of mean surface roughnesses between the third surface 13' and the fourth surface 14' is less than or equal to 30%. As such, it provides excellent surface consistency, aesthetics and integrity, which can meet the demands for commercialized mats in the market. It is noted that there is no similar product on the market so far.

The present invention also provides a method to manufacture mat including the following steps.

Shaping: shaping a main body 10 from a plastic material by a mold. The main body 10 at least has a first surface 11. In the present embodiment, the plastic material is rubber or rubber composite to be soft and resilient.

Cutting: the main body 10' is formed by cutting out a part of the main body 10 to form a second surface 12 having a surface physical characteristic different from that of the first surface 11, such as surface roughness. For example, a mean surface roughness of the second surface 12 is different from that of the first surface 11. The main body is cut to form the second surface of the mean surface roughness between 0.08 μm to 80 μm. The second surface 12 is adjacent to the first surface 11. In the present embodiment, the mat is cuboid and having a top face and a bottom face. Four lateral faces connect the top face and the bottom face therebetween. The first surface 11 is located on the top face, and the second surface 12 is located on each of the lateral faces. The main body is selected from a foamed member, and after the step of cutting, a plurality of open cells are distributed on the second surface.

Shaping again: the first surface 11 and the second surface 12 are under surface processing to vary the surface physical characteristics of the first and second surfaces 11, 12 and to lower the mean surface roughness of the second surface 12 so that a third surface 13 and a fourth surface 14 are formed from the first surface and the second surface respectively wherein the third surface 13 and the fourth surface 14 have different surface physical characteristics. Specifically, differences of mean surface roughnesses between the third and fourth surfaces 13, 14 are reduced to be smaller than differences of the mean surface roughnesses between the first and second surfaces 11, 12. After the second shaping, at least one of the third surface 13 and the fourth surface 14 is shaped to have the mean surface roughness between 0.08 μm to 80 μm. An angle between the third surface 13 and the fourth surface 14 outside the main body 10'' is preferably larger than 180 degrees but not larger than 270 degrees. Preferably, the first surface 11 and the second surface 12 are heated and compressed with a mold having at least one pattern to form the third surface 13 and the fourth surface 14. After the step of shaping again, the third surface and the fourth surface are shaped so that an amount of the open cells distributed on the fourth surface is greater than an amount of the open cells distributed on the third surface. It is noted that there may be none of open cell distributed on the third surface.

Specifically, during the step of shaping, the plastic material is incompletely cross-bridged. However, during the step of shaping again, the plastic material is fully cross-bridged to form the third surface 13 and the fourth surface 14. Besides, a plurality of bumps are integrally formed on the third surface 13 and the fourth surface 14 to make the surface physical characteristics of the third surface 13 and the fourth surface 14 more similar to each other. For example, the bumps are formed by a mold whose inner surface having a plurality of holes. A part of the plurality of bumps 16 are formed to define a plurality of first grooves 161 on the third surface 13, another part of the plurality of bumps 16 are formed to define a plurality of second grooves 162 on the fourth surface 14, and the plurality of second grooves 162 are communicated with the plurality of first grooves 161. Each of the plurality of first grooves 161 is formed to have a depth less than a width of respective one of the plurality of bumps 16. The circumferential face 17 of the mat includes a plurality of lateral side faces 171 and 172, neighboring two of the plurality of lateral side faces 171 and 172 are angularly connected with each other, and parts of the plurality of second grooves 162 on the neighboring two of the plurality of lateral side faces 171 and 172 are communicated with each other.

In conclusion, the step of cutting is advantageous that the size or shape of the mat can be modified. Thus, the main body can be manufactured to mats in various sizes and shapes so that it is not necessary to prepare molds in various sizes and shapes. Therefore, the cost can be reduced, and the mat can be manufactured in a small amount. That is, the cost of stock can be reduced.

What is claimed is:

1. A method to manufacture mat, consisting of only three steps in order:
    first shaping: shaping a main body with a plastic material with a mold to form the main body of one piece, the main body at least having a first surface;
    cutting: cutting out a part of the main body to form a second surface which is wider than a thickness of the main body and is inclined to the first surface, a mean surface roughness of the second surface being different from that of the first surface; and
    second shaping: the first surface and the second surface under surface processing to vary the surface physical characteristics of the first and second surfaces and to lower the mean surface roughness of the second surface so that a third surface and a fourth surface are formed from the first surface and the second surface respectively and so that differences of mean surface roughnesses between the third and fourth surfaces are reduced to be smaller than differences of the mean surface roughnesses between the first and second surfaces, and an angle between the third surface and the fourth surface outside the main body being a specific value;
    wherein the plastic material is incompletely cross-bridged in the first shaping, and the plastic material is fully cross-bridged after the second shaping;
    wherein in the second shaping, the first surface and the second surface are heated and compressed with a second mold having at least one pattern to form the third surface and the fourth surface;
    wherein the main body is a foamed member, and after the step of cutting, a plurality of open cells are distributed on the second surface;
    wherein there are 150 to 250 of said open cells per square inch on the second surface, and after the first surface and the second surface are heated and compressed with the second mold, an area of the plurality of open cells distributed on the fourth surface is reduced to be at least less than 55% of an area of the plurality of open cells distributed on the on the second surface;
    wherein the area of the plurality of open cells distributed on the fourth surface is at least 15% of a total area of the fourth surface;
    wherein the open cell distributed on the fourth surface has a pore size greater than a pore size of the open cell distributed on the third surface;
    wherein the difference of the mean surface roughnesses of the third and fourth surfaces is less than or equal to 30%.

2. The method to manufacture mat of claim 1, wherein the angle between the third surface and the fourth surface outside the main body is larger than 180 degrees and smaller than 225 degrees.

3. The method to manufacture mat of claim 2, wherein the mat is cuboid and has a top face, a bottom face and a circumferential face connecting the top face and the bottom face, the first surface is located on the top face, and the second surface is located on the circumferential face.

4. The method to manufacture mat of claim 1, wherein the plastic material is selected from a group composed of rubber and rubber composite, and the plastic material is soft and resilient.

5. The method to manufacture mat of claim 1, wherein the main body is cut to form the second surface of a mean surface roughness between 0.08 µm to 80 µm, and the mean surface roughness of the second surface is different from that of the first surface.

6. The method to manufacture mat of claim 5, wherein in the second shaping, at least one of the third surface and the fourth surface is shaped to have a mean surface roughness between 0.08 µm to 80 µm.

7. The method to manufacture mat of claim 1, wherein in the second shaping, a plurality of bumps are integrally formed on the main body and distributed on at least one of the third surface and the fourth surface.

8. The method to manufacture mat of claim 7, wherein a part of the plurality of bumps are formed to define a plurality of first grooves on the third surface, another part of the plurality of bumps are formed to define a plurality of second grooves on the fourth surface, and the plurality of second grooves are communicated with the plurality of first grooves.

9. The method to manufacture mat of claim 8, wherein each of the plurality of first grooves is formed to have a depth less than a width of respective one of the plurality of bumps.

10. The method to manufacture mat of claim 8, wherein the mat is cuboid and has a top face, a bottom face and a circumferential face connecting the top face and the bottom face, the first surface is located on the top face, the second surface is located on the circumferential face, the circumferential face includes a plurality of lateral side faces, neighboring two of the plurality of lateral side faces are angularly connected with each other, and parts of the plurality of second grooves on the neighboring two of the plurality of lateral side faces are communicated with each other.

11. The method to manufacture mat of claim 1, wherein after the second shaping, an amount of the open cells distributed on the fourth surface is greater than an amount of the open cells distributed on the third surface.

* * * * *